Dec. 14, 1937.   R. A. SANDBERG   2,102,438
AUTOMOBILE LOCK STRUCTURE
Filed June 11, 1936   2 Sheets-Sheet 1
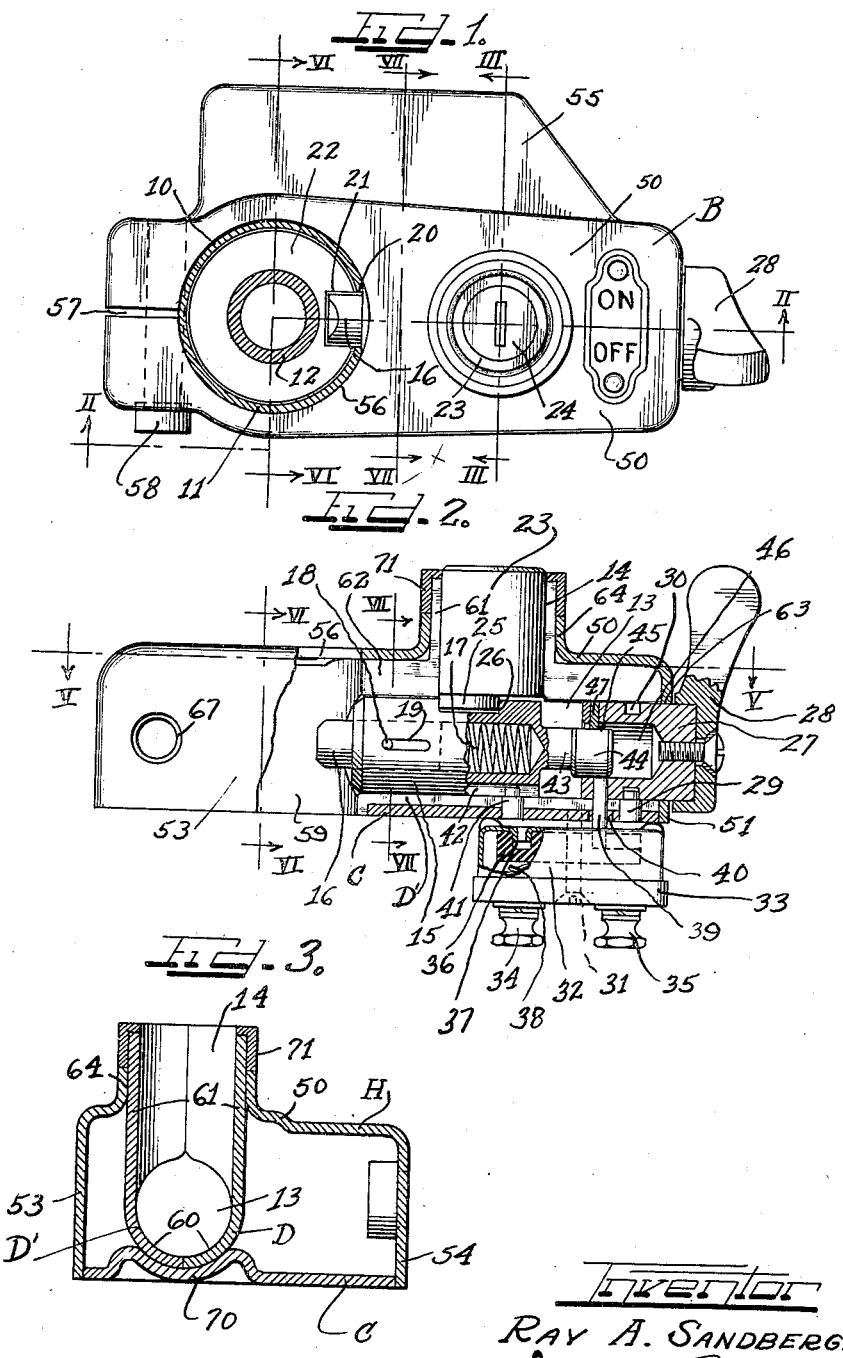
Inventor
RAY A. SANDBERG.

Dec. 14, 1937.    R. A. SANDBERG    2,102,438
AUTOMOBILE LOCK STRUCTURE
Filed June 11, 1936    2 Sheets-Sheet 2
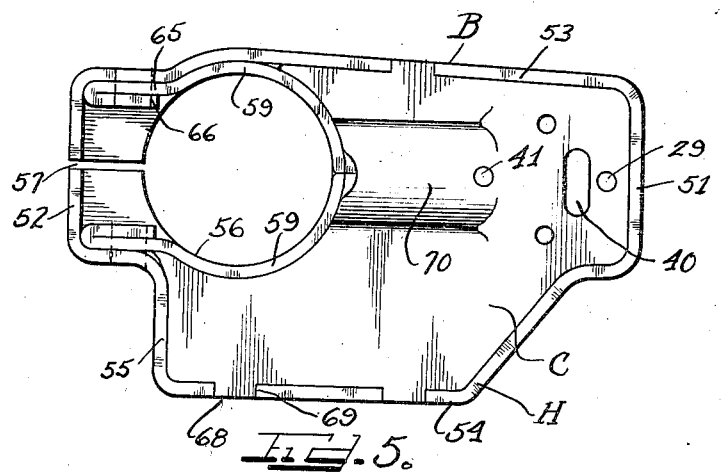
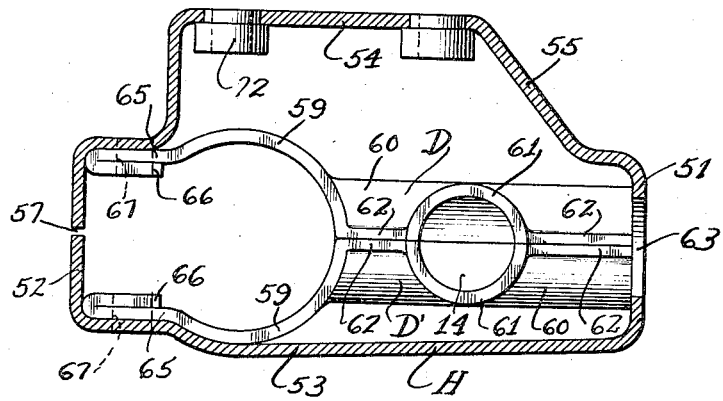
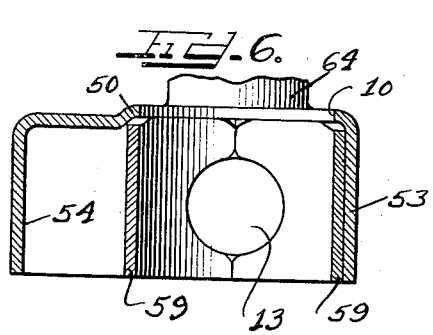
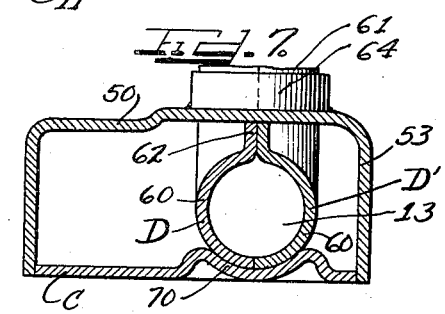
Inventor
Ray A. Sandberg.
by Charles Hill, Attys.

Patented Dec. 14, 1937

2,102,438

UNITED STATES PATENT OFFICE 2,102,438

AUTOMOBILE LOCK STRUCTURE

Ray A. Sandberg, Waukegan, Ill., assignor to Oakes Products Corporation, North Chicago, Ill., a corporation of Michigan Application June 11, 1936, Serial No. 84,601

10 Claims. (Cl. 70—448)

My invention relates to automobile lock structures and particularly to that type in which the lock structure body is secured to the steering column and the body contains mechanism operative to lock the steering shaft and also for operating and controlling a switch as for example a switch for controlling the ignition circuit.

In lock structures of the type referred to, the body structure has heretofore been entirely or in greater part in the form of metal castings and the lock structure has therefore been unnecessarily heavy and not of maximum strength with minimum weight. The important object of my invention is therefore to construct the lock body entirely of metal, preferably steel, stampings, with the number of stampings reduced to a minimum, so that the lock body will possess maximum strength with minimum weight and the operating parts therein and thereon will be more secure against unlawful tampering.

One embodiment of my invention is incorporated in the structure disclosed on the drawings, in which drawings:

Figure 1 is a plan view of a lock structure;

Figure 2 is a side elevation partly in section on plane II—II of Figure 1;

Figure 3 is a section on plane III—III of Figure 1;

Figure 4 is a bottom view of the lock body structure;

Figure 5 is a section on plane V—V of the body structure of Figure 2;

Figure 6 is a section on plane VI—VI of Figures 1 and 2;

Figure 7 is a section on plane VII—VII of Figures 1 and 2.

I have shown my invention applied to a well-known type of lock structure in which a lock body B provides a vertical passageway 10 for receiving a steering post column 11 surrounding a steering shaft 12, with a longitudinal bore 13 at right angles with the passage 10 for receiving steering lock bolt and switch controlling structures, and another bore 14 at right angles with the bore 13 for receiving key-operable lock cylinder structure. In the arrangement shown, the lock bolt structure comprises a cylindrical body part 15 bored to receive the lock plunger 16 which is outwardly urged by a spring 17, the movement of the plunger being limited as by a pin 18 extending therefrom and into a slot 19 in the bolt structure body 15. The plunger is adapted to project through the passage 20 in the steering column 11 and into the notch 21 in the bushing 22 surrounding and secured to the steering shaft 12 in order to lock the steering shaft against rotation by the steering wheel.

In the bore 14 is secured the lock casing 23 whose key-operable lock cylinder 24 has at its inner end a cam 25 engaging in the channel 26 in the lock bolt structure body 15 so that the lock bolt structure may be shifted by the turning of the key to steering locking or unlocking position.

In the outer end of the bore 13 a cylindrical hub 27 is rotatable by means of a handle or lever 28 secured to the outer end thereof, a pin 29 in the body B extending into the circumferentially extending channel 30 in the hub 27 to lock the hub against axial movement.

Secured against the bottom of the body structure B as by means of screws 31 is a switch box 32 having a cover 33 of insulating material mounting contact terminals 34 and 35 for the ignition circuit. An oblong switch block 36 of insulating material is pivoted at one end by a projection 37 from the bottom of the switch block, the switch block on its lower side carrying a switch blade 38 one end of which is below the pivot extension 37 and always in engagement with the circuit terminal 34, while the other end of the switch blade is moved into or out of engagement with the terminal 35 when the switch block is swung. A pin 39 is secured in the lever hub 27 and extends downwardly through a passage 40 in the bottom of the body structure B for engagement with the free end of the switch block so that when the hub 27 is rotated by swing of the lever 28 the switch block will be swung for control of the ignition circuit.

A pin 41 secured in the body B extends into a longitudinal channel 42 in the lock bolt structure body 15 to lock the structure against rotation. A cylindrical neck 43 extends outwardly from the lock bolt structure body 15 and terminates in a cylindrical head 44 which is slabbed off at one side to leave the flat surface 45, the head extending into the bore 46 in the hub 27. Extending diametrally into the bore is a plate 47 in alignment with the flat part 45 on the head 44 and when the lock bolt structure is in its inner or steering locking position the flat 45 will be engaged by the plate 47 so that the lever hub 27 will be locked against rotational movement for operating the switch. However, when the lock bolt structure has been shifted outwardly to its unlocking position, the cylindrical neck 43 will be in alignment with the plate 47 and the hub 27 will then be unlocked for switch operation movement, and the switch can then be turned off and on. When the switch has been turned on, the inner side of the head 44 away from the flat part 45 will be behind the plate 47 and the lock bolt structure cannot then be moved to steering locking position and before this can be accomplished the hub 27 must be rotated back to switch opening position to bring the flat part 45 back into alignment with the plate 47.

Describing now the formation of the body structure, the shown structure comprises the housing body H stamped and formed from a single piece of sheet metal, the bottom wall C for the housing in the form of a sheet metal plate, and the structures D and D' each stamped and formed from a single piece of sheet metal and when assembled providing the steering column passage 10 and the bore 13 for receiving the lock bolt and switch operating structure, and the bore 14 for receiving the lock cylinder casing 23. The housing body is of generally oblong shape and comprises the top wall 50, the end walls 51 and 52, and the front and rear walls 53 and 54. The body may be extended at its rear side to form a projection 55 by means of which the body structure may be secured to a support as for example the instrument board of an automotive vehicle. The housing top wall near its left end is punched out to leave the opening 56 for receiving the steering column 11, and the top wall to the left of the passage 56 and the end wall 52 are slitted as indicated at 57 so that the housing ends at opposite sides of the slit may be drawn together as by a bolt 58 for clamping of the steering column.

Each of the structures D and D' is stamped, drawn and formed from a single piece of sheet metal and comprises an arcuate cylindrical end wall 59, and a semitubular cylindrical wall 60 extending from the inner end of the wall 59 and deflected laterally intermediate its ends to form a semicylindrical tubular wall 61, the wall 60 at its upper edge and between the walls 59 and 61 being deflected to form flanges 62. When the two parts or halves D and D' are brought together, their edges and flanges 62 abut and the flanges may be secured together by welding or by brazing. When the halves are thus brought together, the walls 60 thereof define the longitudinal bore 13 for the locking bolt and switch operating structure and the walls 61 define the bore 14 for the lock cylinder casing 23, and the walls 59 form a passageway for receiving the steering column 11. The structure comprising the halves D and D' is laid in the housing body with the right end of the bore 13 in registration with the opening 63 in the end wall 51 of the housing, this opening forming a continuation of the bore for reception of the lever hub 27 of the switch actuating mechanism.

The transverse extension formed by the semicircular walls 61 on the halves D and D' extends through an annular flange 64 struck up from the top wall 50 of the housing body as clearly shown in Figures 2 and 3.

The walls 59 of the halves D and D' do not form a complete circle but their outer end portions 65 are parallel and the ends 66 are bent inwardly and back against the parallel wall portion to form double thickness wall parts which extend to the end wall 52 and engage against the front and rear walls of the housing body at opposite sides of the slit 57 in the housing body, and the double thickness ends may be secured as by welding or by brazing to the housing walls, the ends and walls having openings 67 for receiving the bolt 58. The inner surfaces of the walls 59 are in register with the inner surface of the passageway 56 through the housing top wall for reception of the steering column 11 and then when the bolt 58 is applied the walls 59 and the end sections of the housing opposite the slit 57 will be securely contracted and clamped around the steering column 11 for rigid support of the lock structure thereon.

The bottom wall C for the housing body H closes the bottom of the main housing and also of the extension 55. As shown on Figure 4, the bottom edges of the wall structures 59, 65, and 66 are flush with the lower edge of the housing body H. The bottom wall C is within the side walls of the housing body the distance of its thickness and surrounds the walls 59 and has tongues 68 for engaging in grooves 69 in the edge of the housing body and the wall may be secured as by forcing over the housing metal against the tongues or by means of brazing or welding.

For assisting in holding the structure D—D' rigidly within the housing body, the bottom wall C may be indented or deflected to form a wall portion 70 of arcuate cross-section for abutting against and receiving the adjacent bottom portions of the walls 60, preferably along an area opposite to the walls 61 which form the bore for the lock cylinder casing 23. The wall portion 70 and the walls 60 may be secured together as by welding.

The tubular wall formed by the walls 61 on the parts D and D' extends upwardly through and beyond the flange 64 on the top wall 50 on the housing body and is reinforced by this flange. A ferrule 71 may be applied around the wall 61 above the flange 64 with its outer end flanged to engage the outer end of the wall structure 61 as clearly shown in Figures 2 and 3.

Threaded bushings 72 may be provided in the rear wall of the extension 55 for receiving screws for securing the lock structure to a support such as the vehicle instrument board.

After assembly and securing the stamped parts forming the lock body, the various holes and passages may be drilled or formed therein for securing the pins 29 and 41, for receiving the screws 31 which secure the switch box, and for providing passageway 40 for the switch actuating pin 39.

I have thus provided a strong, rigid and durable lock body structure for automobile locking devices of the type described, the body structure shown comprising only four essential parts each stamped, drawn, and formed from a single piece of sheet metal such as steel, and the parts rigidly secured in assembled position as by welding or brazing. There is no unnecessary metal and the structure is therefore of minimum weight.

I do not however desire to be limited to the exact structure, arrangement, and assembly shown and described as changes and modifications may be made without departing from the scope of the invention.

I claim as follows:

1. In a steering post lock body, an integral oblong housing comprising top, side, and end walls, said top wall having a steering column receiving opening adjacent one end thereof and a lock cylinder structure receiving opening at the other end thereof, a structure within said housing extending longitudinally thereof and composed of similar integral halves comprising each a semitubular longitudinal wall with a semi-tubular lateral wall extending therefrom and an arcuate wall extending from one end, said halves being secured together edge to edge whereby said longitudinal walls form a cylindrical bore for a shiftable steering post locking bolt structure and said lateral walls form a bore in registration with the lock cylinder structure receiving opening in the housing top, said arcuate walls being in alignment with the housing top opening for receiving the steering column.

2. In a steering post lock body, an integral oblong housing comprising top, side, and end walls, said top wall having a steering column receiving opening adjacent one end thereof and a lock cylinder structure receiving opening at the other end thereof, a structure within said housing extending longitudinally thereof and composed of similar integral halves comprising each a semi-tubular longitudinal wall with a semi-tubular lateral wall extending therefrom and an arcuate wall extending from one end, said halves being secured together edge to edge whereby said longitudinal walls form a cylindrical bore for a shiftable steering post locking bolt structure and said lateral walls form a bore in registration with the lock cylinder structure receiving opening in the housing top, said arcuate walls being in alignment with the housing top opening for receiving the steering column, the ends of said arcuate walls engaging the side walls of the housing and the housing between said wall ends being slitted, said wall ends and side walls being perforated for the reception of a bolt for contracting the slitted ends of said housing and arcuate walls into clamping engagement with the steering column.

3. In a steering post lock body, an integral housing part comprising top, side and end walls and having an open bottom, said top wall near one end having a circular passageway for receiving the steering column surrounding the steering shaft to be locked and having a circular opening near its other end for a lock cylinder structure, a structure within said housing composed of two like integral halves, each half comprising a semi-tubular longitudinal wall with a semi-tubular lateral wall extending therefrom and an arcuate arm at one end, said halves being secured together edge to edge whereby said longitudinal semi-tubular walls will define a cylindrical bore for a shifting lock bolt structure and said lateral semi-tubular walls will extend through the lock cylinder structure receiving opening in the housing top and to define a bore for receiving the lock cylinder structure adapted for engagement with the lock bolt to control the shift thereof, said arcuate arms being in registration to receive the steering column opening in said housing top to surround the steering column, and a wall for closing the open bottom of said housing, said bottom wall being deflected inwardly to form a support for said bore forming longitudinal walls.

4. In a steering post lock body, a structure for receiving and clamping a steering column and providing a longitudinal bore for a shiftable lock bolt and a transverse bore for a lock cylinder for controlling the shift of the lock bolt, said structure being formed of two like integral halves, and a housing for said structure having a steering column receiving passage and an opening in register with said lock cylinder receiving bore.

5. In a steering post lock body, an integral oblong housing comprising top, side and end walls, said top wall having a steering column receiving opening adjacent one end thereof and a second opening at the other end thereof, a structure within said housing extending longitudinally thereof and composed of similar integral halves comprising each a semi-tubular longitudinal wall with a semi-tubular lateral wall extending therefrom and an arcuate wall extending from one end, said halves being secured together edge to edge whereby said longitudinal walls form a cylindrical bore for a shiftable steering post locking bolt structure and said lateral walls form a tubular part extending outwardly through said housing top second opening for receiving a lock cylinder structure, and a flange on said housing top surrounding said second opening and said tubular part, said arcuate walls being in alignment with the first mentioned housing top opening for receiving the steering column.

6. In a steering post lock body, an oblong housing comprising top, side and end walls, said top wall having a steering column receiving opening adjacent one end thereof and a second opening adjacent the other end thereof, a structure within said housing extending longitudinally thereof and composed of similar integral halves comprising each a semi-tubular longitudinal wall with a semi-tubular lateral wall extending therefrom and an arcuate wall extending from one end, said longitudinal walls and said lateral walls abutting edge to edge, and said longitudinal walls having upwardly extending flanges welded together for maintaining such edge to edge engagement, said longitudinal walls forming a cylindrical bore for a shiftable steering post lock bolt structure, and said lateral walls forming a tubular part projecting outwardly through said second opening in the housing top to receive a lock cylinder structure for controlling the movements of the bolt, an outwardly extending flange on said housing top surrounding said second opening and said tubular part, said flanges abutting against said top wall, and a closure wall for the bottom of said housing having a portion deflected inwardy to form a seat for engagement by the lower portions of said semi-tubular longitudinal walls, said arcute walls being in alignment with the first mentioned housing top opening for receiving the steering column.

7. In a steering post lock body, an inner structure for receiving and clamping a steering column and providing a longitudinal bore for a shiftable lock bolt and a transverse bore for a lock cylinder for controlling the shift of the lock bolt, an outer structure in the form of a housing for said inner structure having a steering column receiving passage and an opening in register with said lock cylinder receiving bore, and means for securing said inner structure in said housing.

8. A steering post lock body comprising an inner structure formed to define a cylindrical bore for supporting a shiftable steering post lock bolt structure and a cross bore for receiving a lock cylinder structure for controlling the shifting of the bolt structure and having substantially semi-circular arms extending therefrom for encircling a steering post column, and an outer structure in the form of a housing having a steering column receiving opening concentric with said arms and having another opening in register with said cross bore for receiving a lock cylinder in said cross bore.

9. A steering post lock body comprising an inner structure formed to define a cylindrical bore for supporting a shiftable steering post lock bolt structure and a cross bore for receiving a lock cylinder structure for controlling the shifting of the bolt structure and having substantially semi-circular arms extending therefrom for encircling a steering post column, and an outer structure in the form of a housing having a steering column receiving opening concentric with said arms and having another opening in register with said cross bore for receiving a lock cylinder in said cross bore, said arms being secured to said housing.

10. In a steering post lock body, an inner structure for receiving and clamping a steering column and providing a longitudinal bore for a shiftable lock bolt and a transverse bore for a lock cylinder for controlling the shift of the lock bolt, an outer structure in the form of a housing for said inner structure having a steering column receiving passage and an opening in register with said lock cylinder receiving bore, and means for securing said inner structure in said housing, and a separable bottom for said housing for holding said inner structure therein.

RAY A. SANDBERG.